(12) United States Patent
Zhou et al.

(10) Patent No.: US 11,922,897 B2
(45) Date of Patent: Mar. 5, 2024

(54) DATA DRIVING CIRCUIT, DISPLAY MODULE, AND DISPLAY DEVICE

(71) Applicant: HKC Corporation Limited, Guangdong (CN)

(72) Inventors: Mancheng Zhou, Guangdong (CN); Haoxuan Zheng, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/090,629

(22) Filed: Dec. 29, 2022

(65) Prior Publication Data

US 2023/0377530 A1    Nov. 23, 2023

(30) Foreign Application Priority Data

May 19, 2022    (CN) .......................... 202210547325.6

(51) Int. Cl.
G09G 3/36    (2006.01)

(52) U.S. Cl.
CPC ..... *G09G 3/3688* (2013.01); *G09G 2310/027* (2013.01)

(58) Field of Classification Search
CPC .......... G09G 3/3688; G09G 2310/027; G09G 2310/0297; G09G 3/3696
See application file for complete search history.

(56) References Cited

U.S. PATENT DOCUMENTS 8,896,513 B2 * 11/2014 Bi .......................... H03M 1/682
345/98
10,789,900 B2 * 9/2020 Kim ..................... G09G 3/3607
(Continued)

FOREIGN PATENT DOCUMENTS

CN    1412738 A    4/2003
CN    1422421 A    6/2003
(Continued)

OTHER PUBLICATIONS

Notice for First Trial dated Feb. 11, 2023 received in Chinese Patent Application No. CN 202210547325.6.

*Primary Examiner* — Michael J Jansen, II
(74) *Attorney, Agent, or Firm* — Scully, Scott, Murphy & Presser, P.C.

(57) ABSTRACT

A data driving circuit, a display module, and a display device are provided. The data driving circuit is configured to drive a display device to display different grayscale images. The voltage-dividing circuit includes $2^n$ voltage-dividing signal terminals arranged sequentially from low to high voltage. The switching circuit includes $2^n$ switching sub-circuits. Each of the $2^n$ switching sub-circuits includes a receiving terminal, a first output terminal, and a second output terminal. The receiving terminal is electrically coupled to the voltage-dividing signal terminal. The voltage selecting circuit includes $2^n$ selecting signal terminals. Each of the $2^n$ selecting signal terminals is electrically coupled with the first output terminal of one of the $2^n$ switching sub-circuits and the second output terminal of one of the $2^n$ switching sub-circuits.

14 Claims, 10 Drawing Sheets

(56) References Cited

U.S. PATENT DOCUMENTS

| | | | |
|---|---|---|---|
| 2003/0141998 A1 | 7/2003 | Matsui | |
| 2008/0150874 A1 | 6/2008 | Kida et al. | |
| 2009/0066681 A1* | 3/2009 | Kim | G09G 3/3685 |
| | | | 341/145 |
| 2010/0002019 A1* | 1/2010 | Lee | G09G 3/3688 |
| | | | 345/88 |
| 2013/0194284 A1* | 8/2013 | Bi | H03M 1/682 |
| | | | 345/522 |
| 2019/0180702 A1* | 6/2019 | Kim | G09G 3/3258 |

FOREIGN PATENT DOCUMENTS

| | | |
|---|---|---|
| CN | 1726528 A | 1/2006 |
| CN | 101132178 A | 2/2008 |
| CN | 102810302 A | 12/2012 |
| CN | 103325357 A | 9/2013 |
| CN | 106486072 A | 3/2017 |
| CN | 106652954 A | 5/2017 |
| CN | 106898314 A | 6/2017 |
| KR | 100844775 B1 | 7/2008 |
| TW | 200625253 A | 7/2006 |

\* cited by examiner

| Data signal | Grayscale value corresponding to output analog voltage | Data signal | Grayscale value corresponding to output analog voltage |
| --- | --- | --- | --- |
| G0 | V63 | G32 | V31 |
| G1 | V62 | G33 | V30 |
| G2 | V61 | G34 | V29 |
| G3 | V60 | G35 | V28 |
| G4 | V59 | G36 | V27 |
| G5 | V58 | G37 | V26 |
| G6 | V57 | G38 | V25 |
| G7 | V56 | G39 | V24 |
| G8 | V55 | G40 | V23 |
| G9 | V54 | G41 | V22 |
| G10 | V53 | G42 | V21 |
| G11 | V52 | G43 | V20 |
| G12 | V51 | G44 | V19 |
| G13 | V50 | G45 | V18 |
| G14 | V49 | G46 | V17 |
| G15 | V48 | G47 | V16 |
| G16 | V47 | G48 | V15 |
| G17 | V46 | G49 | V14 |
| G18 | V45 | G50 | V13 |
| G19 | V44 | G51 | V12 |
| G20 | V43 | G52 | V11 |
| G21 | V42 | G53 | V10 |
| G22 | V41 | G54 | V9 |
| G23 | V40 | G55 | V8 |
| G24 | V39 | G56 | V7 |
| G25 | V38 | G57 | V6 |
| G26 | V37 | G58 | V5 |
| G27 | V36 | G59 | V4 |
| G28 | V35 | G60 | V3 |
| G29 | V34 | G61 | V2 |
| G30 | V33 | G62 | V1 |
| G31 | V32 | G63 | V0 |

FIG. 10

| Data signal | Grayscale value corresponding to output analog voltage | Data signal | Grayscale value corresponding to output analog voltage |
|---|---|---|---|
| G0 | V0 | G32 | V32 |
| G1 | V1 | G33 | V33 |
| G2 | V2 | G34 | V34 |
| G3 | V3 | G35 | V35 |
| G4 | V4 | G36 | V36 |
| G5 | V5 | G37 | V37 |
| G6 | V6 | G38 | V38 |
| G7 | V7 | G39 | V39 |
| G8 | V8 | G40 | V40 |
| G9 | V9 | G41 | V41 |
| G10 | V10 | G42 | V42 |
| G11 | V11 | G43 | V43 |
| G12 | V12 | G44 | V44 |
| G13 | V13 | G45 | V45 |
| G14 | V14 | G46 | V46 |
| G15 | V15 | G47 | V47 |
| G16 | V16 | G48 | V48 |
| G17 | V17 | G49 | V49 |
| G18 | V18 | G50 | V50 |
| G19 | V19 | G51 | V51 |
| G20 | V20 | G52 | V52 |
| G21 | V21 | G53 | V53 |
| G22 | V22 | G54 | V54 |
| G23 | V23 | G55 | V55 |
| G24 | V24 | G56 | V56 |
| G25 | V25 | G57 | V57 |
| G26 | V26 | G58 | V58 |
| G27 | V27 | G59 | V59 |
| G28 | V28 | G60 | V60 |
| G29 | V29 | G61 | V61 |
| G30 | V30 | G62 | V62 |
| G31 | V31 | G63 | V63 |

DATA DRIVING CIRCUIT, DISPLAY MODULE, AND DISPLAY DEVICE

CROSS-REFERENCE TO RELATED APPLICATIONS

This application claims priority under 35 U.S.C. § 119(a) to Chinese Patent Application No. 202210547325.6, filed May 19, 2022, the entire disclosure of which is incorporated herein by reference.

TECHNICAL FIELD

The disclosure relates to the field of display technology, and in particular to a data driving circuit, a display module including the driving circuit, and a display device including the display module.

BACKGROUND

At present, liquid-crystal-displays (LCD) have become mainstream display devices in the market because of characteristics such as power saving, low power consumption, weak radiation, small size, and small weight. With the development of liquid crystal technology, LCD devices are developing towards higher resolution, higher display quality, and larger screen size.

LCDs can be generally classified into a normally-white LCD and a normally-black LCD. The normally-white LCD is characterized in that the panel brightness becomes lower with an increase of deflecting voltage. The normally-black LCD is characterized in that the panel brightness becomes higher with the increase of deflecting voltage. Therefore, the driving circuit cannot be applied in both the normally-black mode and the normally-white mode, resulting in poor compatibility of the driving circuit.

SUMMARY

In a first aspect, a data driving circuit is provided in the present disclosure. The data driving circuit is configured to drive a display device to display different grayscale images. The data driving circuit includes a Data Signal Processing (DSP) unit and a Digital-to-Analog Conversion (DAC) unit electrically coupled with the DSP unit. The DAC unit includes a voltage-dividing circuit, a switching circuit, and a voltage selecting circuit. The voltage-dividing circuit includes $2^n$ voltage-dividing signal terminals arranged sequentially from low to high voltage. The switching circuit includes $2^n$ switching sub-circuits. Each of the $2^n$ switching sub-circuits includes a receiving terminal, a first output terminal, and a second output terminal. Receiving terminals of the $2^n$ switching sub-circuits are electrically coupled to the $2^n$ voltage-dividing signal terminal in one-to-one correspondence. The voltage selecting circuit includes $2^n$ selecting signal terminals. Each of the $2^n$ selecting signal terminals is electrically coupled with the first output terminal of one of the $2^n$ switching sub-circuits and the second output terminal of one of the $2^n$ switching sub-circuits. The voltage selecting circuit is configured to receive a data signal from the DSP unit, where n is an integer greater than or equal to 2. The voltage-dividing signal terminal, the first output terminal of the switching sub-circuit, and the selecting signal terminal are conducted according to the data signal to output a first analog voltage, or the voltage-dividing signal terminal, the second output terminal of the switching sub-circuit, and the selecting signal terminal are conducted according to the data signal to output a second analog voltage.

In a second aspect, a display module is further provided in the present disclosure. The display module includes a display panel, a scan driving circuit, and the data driving circuit of the first aspect.

In a third aspect, a display device is further provided in the present disclosure. The display device includes a power supply module and the display module of the second aspect.

BRIEF DESCRIPTION OF THE DRAWINGS

In order to explain technical solutions in implementations of the present disclosure more clearly, the following will give a brief introduction to accompanying drawings which are needed to be used in implementations. Apparently, the accompanying drawings in the following description are some implementations of the present disclosure. For those skilled in the art, other accompanying drawings can be obtained according to these accompanying drawings without creative efforts.

FIG. 10 is a diagram illustrating a correspondence between data signals and grayscale values of a display device in a normally-black mode.

FIG. 11 is a diagram illustrating a correspondence between data signals and grayscale values of a display device in a normally-white mode.

DESCRIPTION OF REFERENCE NUMBERS

Figure 1:
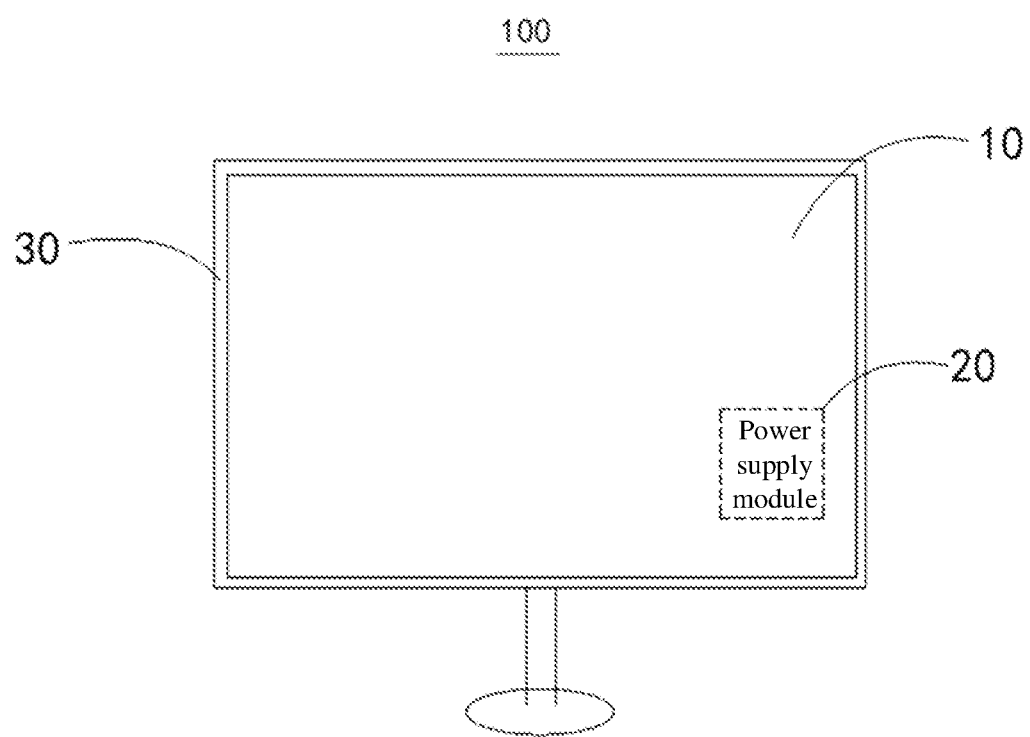
FIG. 1 is a schematic structural diagram of a display device disclosed in implementations of the present disclosure.

100—display device, 10—display module, 11—data driving circuit, 20—power supply module, 30—supporting frame, 110—Data Signal Processing (DSP) unit, 111—input register, 112—data latch, 114—signal amplifier, 130—DAC unit, 40—voltage-dividing circuit, 41—resistor string, 42—first voltage reference terminal, 43—second voltage reference terminal, 44—voltage-dividing signal terminal, 50—switching circuit, 51—switching sub-circuit, 511—receiving terminal, 512—first output terminal, 513—second output terminal, 514—second receiving terminal, 516—first transistor, 517—second transistor, 518—third transistor, 519—fourth transistor, 60—voltage selecting circuit,

61—selecting signal terminal, 136—output buffer, R1~R64—resistors, V0~V63—grayscale values, G0~G63—data signals.

DETAILED DESCRIPTION

In order to facilitate understanding of the present disclosure, a comprehensive description will be given below with reference to relevant accompanying drawings. The accompanying drawings illustrate some exemplary implementations of the present disclosure. However, the present disclosure can be implemented in many different forms and is not limited to implementations described herein. On the contrary, these implementations are provided for a more thorough and comprehensive understanding of the present disclosure.

The following implementations are described with reference to accompanying drawings to illustrate particular implementations in which the present disclosure may be implemented. The serial numbers per se assigned herein for the components, such as "first", "second", etc., are only used to distinguish between objects described and do not have any sequential or technical meaning. The "connection" and "coupling" in the present disclosure, unless otherwise specified, include direct and indirect connection (coupling). Direction terms mentioned in the present disclosure, such as "up", "down", "front", "back", "left", "right", "inside", "outside", "side", etc., are only directions with reference to the directions of the accompanying drawings. Therefore, the direction terms are used for better and clearer illustration and understanding of the present disclosure, and are not intended to indicate or imply that the device or component must have a specific orientation, be constructed and operated in the particular orientation, and therefore cannot be construed as limiting to the present disclosure.

In the description of the present disclosure, it should be noted that unless otherwise expressly specified or defined, terms such as "mount", "couple", and "connect" should be understood broadly. For example, the connection may be a fixed connection, or a detachable connection, or an integrated connection; may be a mechanical connection; and may be a direct connection, or an indirect connection via an intermediate medium, or may be an internal communication between two components. The specific meanings of the above-mentioned terms in the present disclosure could be understood by those of ordinary skill in the art according to specific situations. It should be noted that the terms "first", "second", etc. in the specification, claims and accompanying drawings of the present disclosure are used to distinguish different objects, rather than to describe a specific order.

In addition, terms "comprise", "may comprise", "include", or "may include" used in the present disclosure indicate the existence of corresponding functions, operations, components, etc., which are disclosed, and do not limit one or more other functions, operations, components, etc. Moreover, the terms "comprise" or "include" indicate the existence of corresponding features, numbers, steps, operations, elements, components, or combinations thereof disclosed in the specification, and do not exclude the existence or addition of one or more other features, numbers, steps, operations, elements, components, or combinations thereof, with the intent of covering non-exclusive inclusion. Furthermore, when describing implementations of the present disclosure, "may" is used to mean "one or more implementations of the present disclosure". Also, the term "exemplary" is intended to refer to examples or illustrations.

Unless otherwise defined, all technical and scientific terms used herein have the same meaning as commonly understood by those skilled in the art of the present disclosure. The terms used herein in the specification of the present disclosure are for the purpose of describing specific implementations only and are not intended to limit the present disclosure.

Referring to FIG. 1, FIG. 1 is a schematic structural diagram of a display device 100 disclosed in implementations of the present disclosure. In the implementation of the present disclosure, the display device 100 includes a display module 10, a power supply module 20, and a supporting frame 30. The display module 10 is fixed to the supporting frame 30. The power supply module 20 is disposed on a back surface of the display module 10, that is, a non-display surface of the display module 10. The display module 10 is configured to display an image. The power supply module 20 is configured to provide a power supply voltage for the display module 10 to display the image. The supporting frame 30 can fix and protect the display module 10 and the power supply module 20.

It can be appreciated that the display module 10 also has a display surface disposed opposite the non-display surface, i.e., a front surface of the display module 10, where the display surface is configured to face a user of the display device 100 to display an image.

In an implementation of the present disclosure, the display module 10 may at least include a data driving circuit 11 and a display panel (not shown). The data driving circuit 11 is disposed in a peripheral region of the display panel, and is configured to provide a power supply and a driving signal to the display panel, thereby controlling the display panel to display an image.

Figure 2:
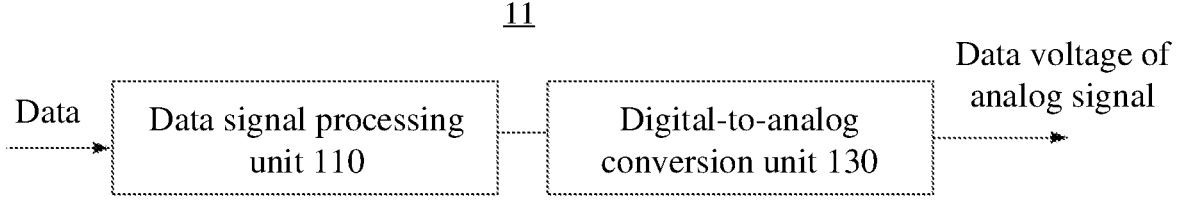
FIG. 2 is a functional block diagram of a data driving circuit disclosed in the present disclosure.
Figure 3:
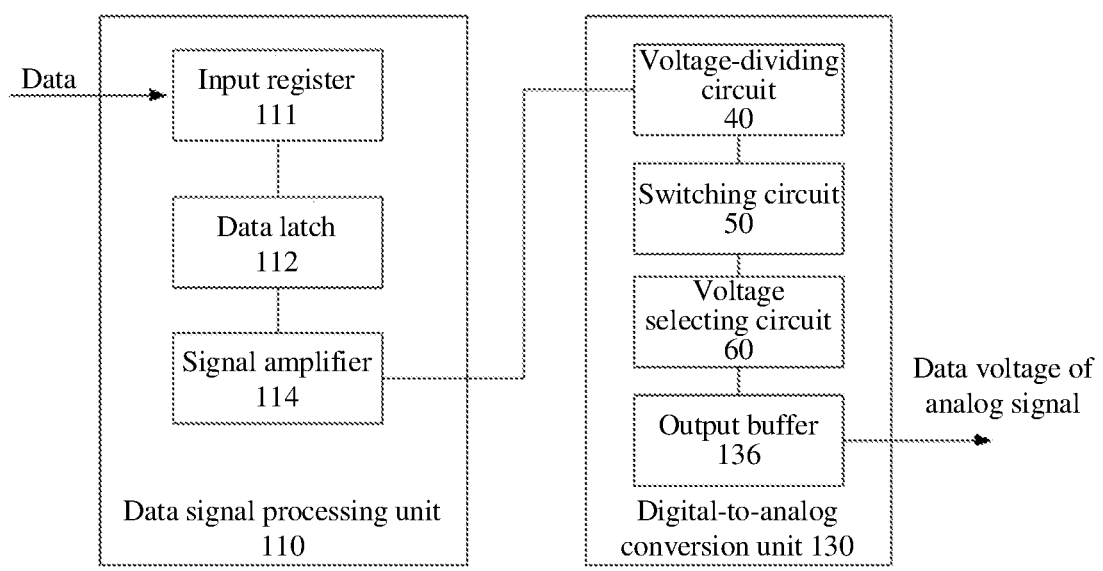
FIG. 3 is a detailed schematic circuit diagram of the data driving circuit in FIG. 2.

Referring to FIG. 2 and FIG. 3, FIG. 2 is a functional block diagram of the data driving circuit 11 disclosed in the present disclosure, and FIG. 3 is a detailed schematic circuit diagram of the data driving circuit 11 in FIG. 2. As illustrated in FIG. 2, the data driving circuit 11 is configured to drive the display device 100 to display different grayscale images. The data driving circuit 11 includes a Data Signal Processing (DSP) unit 110 and a Digital-to-Analog Conversion (DAC) unit 130. The DSP unit 110 and the DAC unit 130 are electrically coupled. The DSP unit 110 is configured to receive a data signal, process the data signal, and transmits the processed data signal to the DAC unit 130. The DAC unit 130 is configured to convert the data signal into a data voltage of an analog signal for output, where the data voltage of the analog signal corresponds to different grayscale values of the display panel of the display device 100.

As illustrated in FIG. 3, in an implementation of the present disclosure, the DSP unit 110 may include an input register 111, a data latch 112 electrically coupled to the input register 111, and a signal amplifier 114 electrically coupled to the data latch 112. A timing controller (not shown) is configured to control the data signal Data to be transmitted to the input register 111. The input register 111 is configured to format the data signal Data, such that the data signal Data can be identified by the data driving circuit 11. The data latch 112 is configured to temporarily store the data signal. The signal amplifier 114 is configured to convert the data signal from a low-voltage pulse signal to a high-voltage pulse signal and transmit the converted data signal to the DAC unit 130.

The DAC unit 130 is configured to convert the data signal into the data voltage of the analog signal for output, where the data voltage of the analog signal is used for driving the display panel to display images corresponding to different grayscale values.

Figure 4:
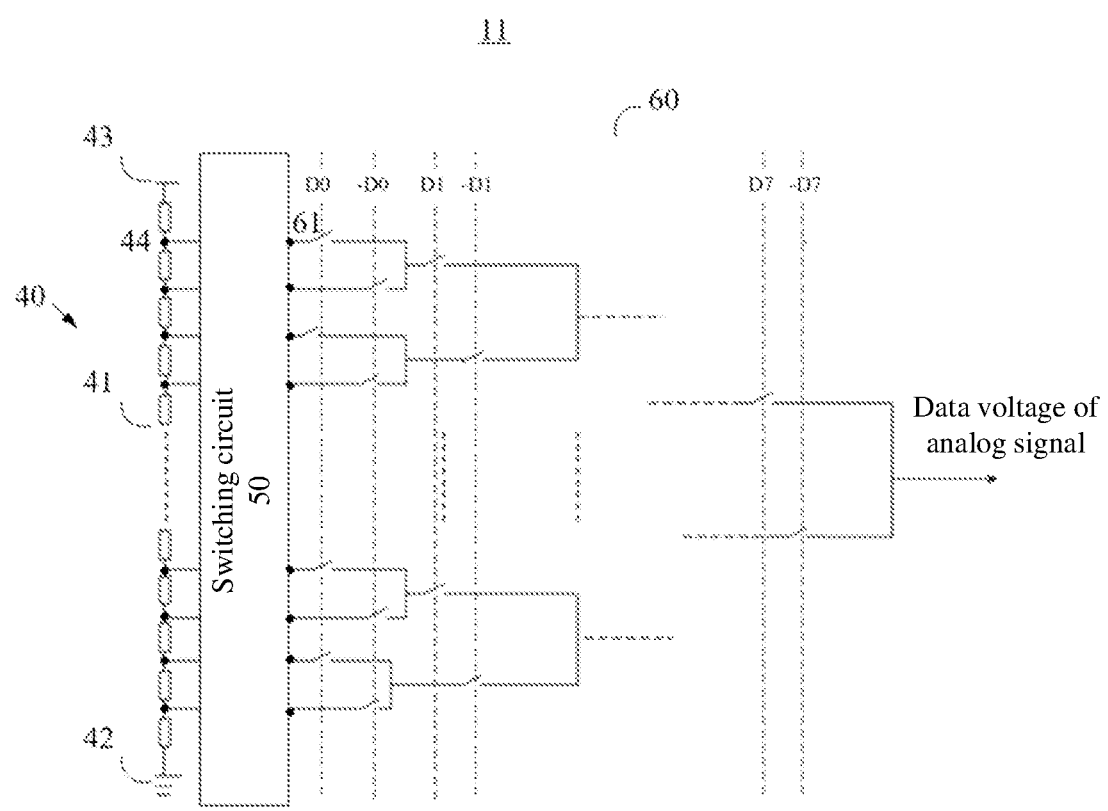
FIG. 4 is a schematic circuit structural diagram of a digital-to-analog conversion (DAC) unit in FIG. 2.

Referring also to FIG. 4, FIG. 4 is a schematic circuit structural diagram of the DAC unit 130 in FIG. 2. As illustrated in FIG. 3 and FIG. 4, in an implementation of the present disclosure, the DAC unit 130 is electrically coupled to the signal amplifier 114. The DAC unit 130 may include a voltage-dividing circuit 40, a switching circuit 50, and a voltage selecting circuit 60. The voltage-dividing circuit 40 includes $2^n$ voltage-dividing signal terminals 44 which are arranged sequentially as a first to $2^n$-th voltage-dividing signal terminals 44 from low to high voltage, where n is an integer greater than or equal to 2. In a specific implementation of the present disclosure, the value of n is 6, that is, the voltage-dividing circuit 40 includes 64 voltage-dividing signal terminals 44.

Figure 5:
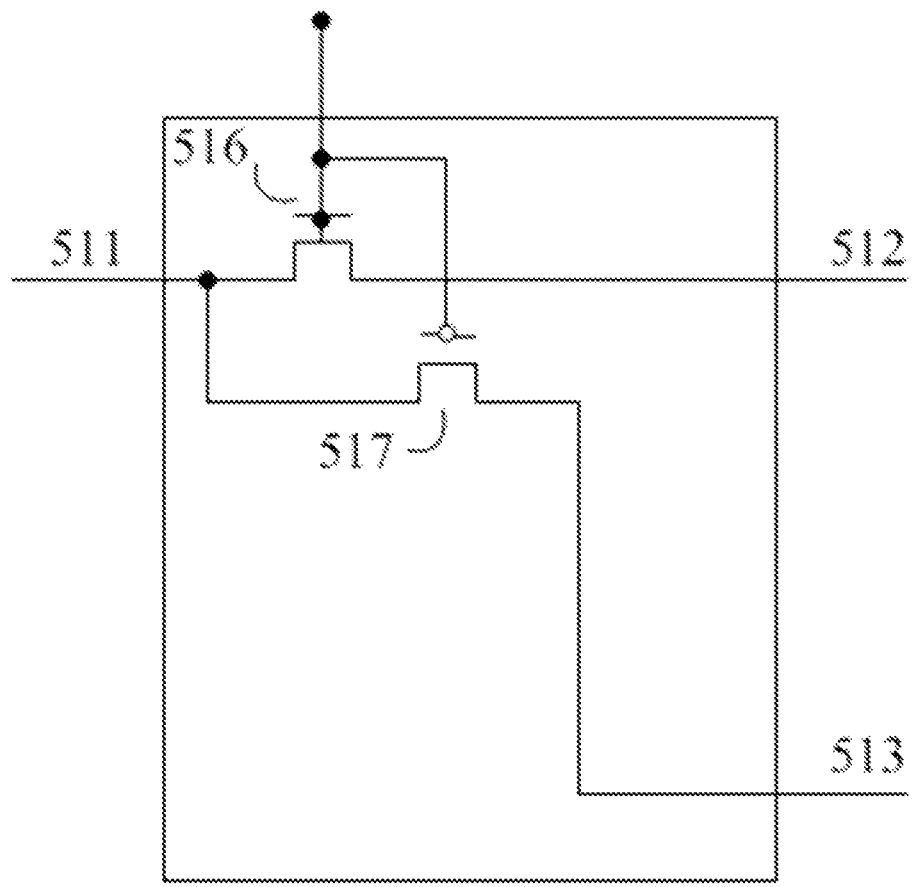
FIG. 5 is a schematic circuit diagram of a switching sub-circuit of a switching circuit in FIG. 4.

Referring also to FIG. 5, FIG. 5 is a schematic circuit diagram of a switching sub-circuit of the switching circuit in FIG. 4. The switching circuit 50 includes $2^n$ switching sub-circuits 51. Each of the $2^n$ switching sub-circuits 51 includes a receiving terminal 511, a first output terminal 512, and a second output terminal 513. Specifically, the receiving terminal 511 and the first output terminal 512 are selectively coupled to form a first-mode path, or the receiving terminal 511 and the second output terminal 513 are selectively coupled to form a second-mode path. The $2^n$ receiving terminals 511 of the switching sub-circuit 51 are electrically coupled to the $2^n$ voltage-dividing signal terminals 44 respectively.

The voltage selecting circuit 60 includes $2^n$ selecting signal terminals 61, and is provided with data lines for receiving a first to m-th bit of the data signal. Each of the $2^n$ selecting signal terminals 61 is electrically coupled with the first output terminal 512 of one of the $2^n$ switching sub-circuits 51 and the second output terminal 513 of one of the $2^n$ switching sub-circuits 51. In a specific implementation of the present disclosure, specifically, the first to m-th bits of the data signal are D0~D7.

According to a preset setting, the switching circuit 50 is configured to selectively conduct the voltage-dividing signal terminal 44, the first-mode path, and the selecting signal terminal 61 to output a first analog voltage, or conduct the voltage-dividing signal terminal 44, the second-mode path, and the selecting signal terminal 61 to output a second analog voltage.

It can be appreciated that the first-mode path or the second-mode path is conducted according to the preset setting depending on whether the display device 100 is a normally-black display device or a normally-white display device.

It can be appreciated that the first analog voltage corresponds to the normally-black display device and the second analog voltage corresponds to the normally-white display device. The first analog voltage and the second analog voltage are data voltages of analog signals.

In other implementations of the present disclosure, the DAC unit 130 also includes an output buffer 136 configured to enhance the channel driving capability of the data driving circuit 11. The data voltage of the output analog signal is transmitted to the display panel via the output buffer 136 for driving the display panel to display a grayscale image corresponding to the data voltage of the analog signal.

Still referring to FIG. 4, in an implementation of the present disclosure, the voltage-dividing circuit 40 may include a first voltage reference terminal 42, a second voltage reference terminal 43, and a resistor string 41 of $2^n-1$ resistors connected in series. The resistor string 41 includes $2^n$ serially connected nodes, which are arranged sequentially as a first to $2^n$-th serially connected nodes from low to high voltage. The first to $2^n$ serially connected nodes are electrically coupled to the first to $2^n$ voltage-dividing signal terminals 44 respectively. The first serially connected node is electrically coupled to the first voltage reference terminal 42, and the $2^n$-th serially connected node is electrically coupled to the second voltage reference terminal 43. A voltage of the first voltage reference terminal 42 is lower than a voltage of the second voltage reference terminal 43.

Still referring to FIG. 4 and FIG. 5, in an implementation of the present disclosure, the voltage selecting circuit 60 is an m-bit binary-tree switch network including $2^n$ selecting signal terminals 61. The $2^n$ selecting signal terminals 61 are arranged as a first to $2^n$-th selecting signal terminals 61 from low to high voltage. The first to $2^n$-th selecting signal terminals 61 are electrically coupled to the first output terminal 512 and the second output terminal 513 of the corresponding switching sub-circuit 51.

In an implementation of the present disclosure, the m-bit binary-tree switch network also includes $2^{n+1}-2$ switches. Specifically, each path corresponding to each of the voltage-dividing signal terminals 44 includes m switches. The voltage selecting circuit 60 is configured to receive the first to m-th bits of the data signal, and control the m switches to turn on or off correspondingly according to the first to m-th bits of the data signal, to conduct the corresponding voltage-dividing signal terminal 44, the corresponding switching sub-circuit 51, and the corresponding selecting signal terminal 61, thereby obtaining different levels of data voltages of analog signals.

In an implementation of the present disclosure, the data signal has the first to m-th bits which are input to the voltage selecting circuit 60 along multiple data lines D1~Dm respectively, to conduct the selecting signal terminal 61.

In an implementation of the present disclosure, the value of m is 8, i.e., the data signal has 8 bits, and each bit of the data signal includes a pair of gamma voltages. The gamma voltages include a first level and a second level. The first level is a high level and the second level is a low level. m and n may be determined as other values according to performance requirements of the DAC unit 130, which is not specifically limited in the present disclosure.

As illustrated in FIG. 5, in an implementation of the present disclosure, any of the switching sub-circuits 51 may be defined as a j-th switching sub-circuit including a receiving terminal 511, a first output terminal 512, and a second output terminal 513. The receiving terminal 511 of the j-th switching sub-circuit is electrically coupled to a j-th voltage-dividing signal terminal 44. The first output terminal 512 is electrically coupled to a j-th selecting signal terminal 61. The second output terminal 513 is electrically coupled to a $2^n-(j-1)$-th selecting signal terminal 61. The receiving terminal 511 is selectively coupled with the first output terminal 512 or the second output terminal 513 according to different modes of the display device 100, where j is an integer greater than or equal to 1 and less than $2^n$.

Specifically, when the display device 100 is in the normally-black mode, the receiving terminal 511 and the first output terminal 512 of the j-th switching sub-circuit are conducted to form the first-mode path. Then the j-th voltage-dividing signal terminal 44 and the j-th selecting signal terminal 61 are conducted to output the first analog voltage.

When the display device 100 is in the normally-white mode, the receiving terminal 511 and the second output terminal 513 of the j-th switching sub-circuit are conducted to form the second-mode path. Then the j-th voltage-dividing signal terminal 44 and the $2^n$-(j-1)-th selecting signal terminal 61 are conducted to output the second analog voltage.

As illustrated in FIG. 5, in an implementation of the present disclosure, each of the switching sub-circuits 51 includes a first transistor 516 and a second transistor 517.

Specifically, the first transistor 516 includes a control terminal, a first terminal, and a second terminal. The control terminal of the first transistor 516 is electrically coupled to an enable terminal to receive an enable signal. The enable signal can be used for controlling the first transistor 516 to turn on or off. The first terminal of the first transistor 516 is electrically coupled to the receiving terminal 511 of the switching sub-circuit 51 to conduct with the corresponding voltage-dividing signal terminal 44. The second terminal of the first transistor 516 is electrically coupled to the first output terminal 512 of the switching sub-circuit 51 to conduct with the corresponding selecting signal terminal 61.

The second transistor 517 includes a control terminal, a first terminal, and a second terminal. The control terminal of the second transistor 517 is electrically coupled to the enable terminal to receive the enable signal. The enable signal can be used for controlling the second transistor 517 to turn on or off. The first terminal of the second transistor 517 is electrically coupled to the receiving terminal 511 of the switching sub-circuit 51 to conduct with the corresponding voltage-dividing signal terminal 44. The second terminal of the second transistor 517 is electrically coupled to the second output terminal 513 of the switching sub-circuit 51 to conduct with the corresponding selecting signal terminal 61.

In an implementation of the present disclosure, the first transistor 516 may be an N-type-Metal-Oxide-Semiconductor (NMOS) transistor, and the second transistor 517 may be a P-type-Metal-Oxide-Semiconductor (PMOS) transistor.

In an implementation of the present disclosure, when the display device 100 is in the normally-black mode, the enable signal has a first level. When the display device 100 is in the normally-white mode, the enable signal has a second level. The first level is a high level and the second level is a low level.

Figure 6:
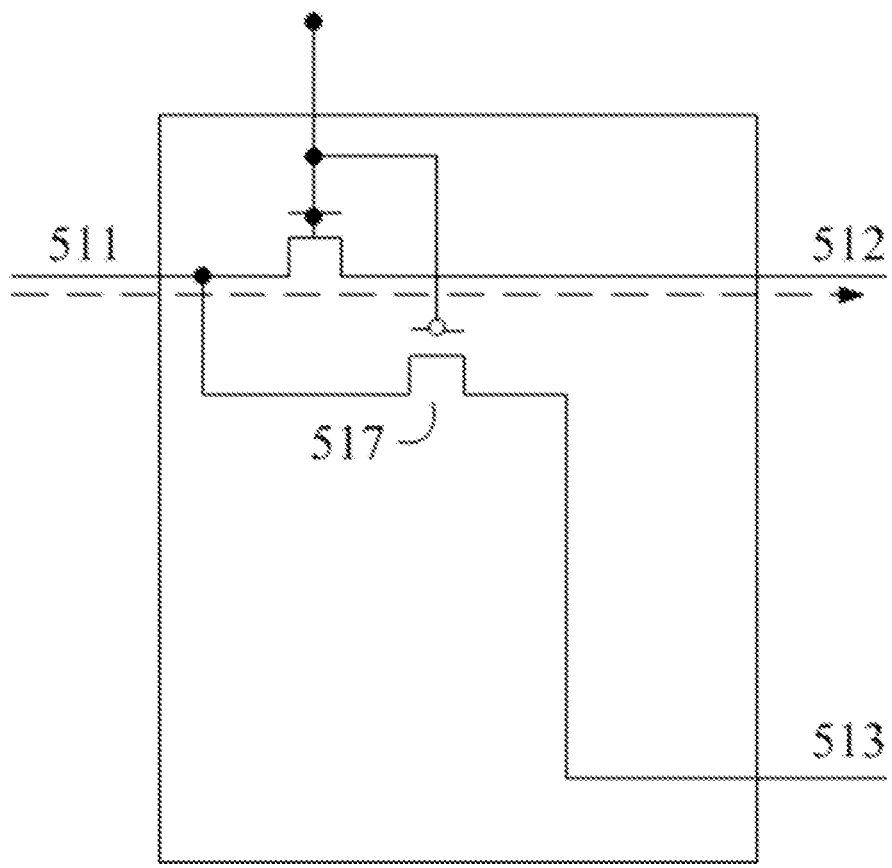
FIG. 6 is a schematic diagram of a corresponding conductive path of the switching sub-circuit in FIG. 5 in a normally-black display device.
Figure 7:
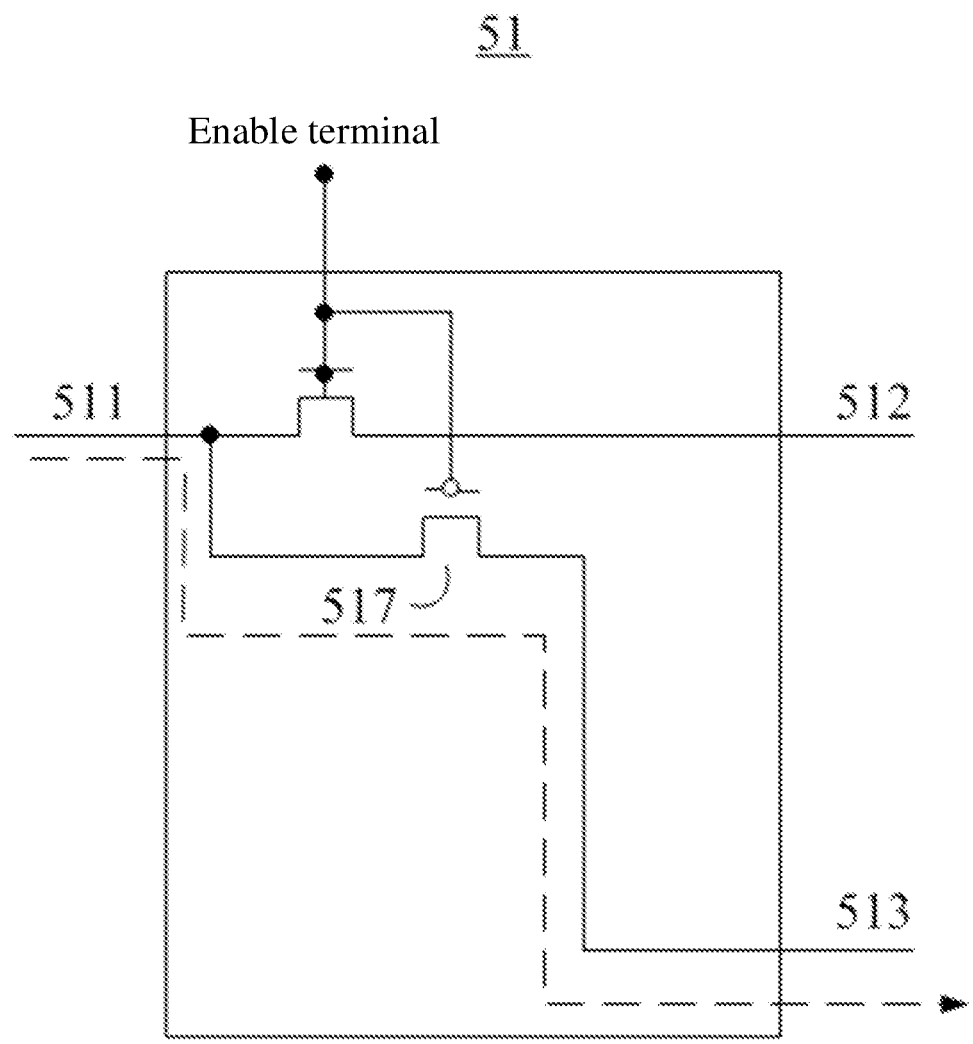
FIG. 7 is a schematic diagram of a corresponding conductive path of the switching sub-circuit in FIG. 5 in a normally-white display device.

Referring also to FIG. 6 and FIG. 7, FIG. 6 is a schematic diagram of a corresponding conductive path of the switching sub-circuit in FIG. 5 in a normally-black display device, and FIG. 7 is a schematic diagram of a corresponding conductive path of the switching sub-circuit in FIG. 5 in a normally-white display device.

As illustrated in FIG. 6, when the display device 100 is in the normally-black mode, i.e., when the enable signal has the first level, the first transistor 516 is turned on and the second transistor 517 is turned off. The receiving terminal 511 of the j-th switching sub-circuit and the j-th voltage-dividing signal terminal 44 are conducted, and the first output terminal 512 of the j-th switching sub-circuit and the j-th selecting signal terminal 61 are conducted, to output the first analog voltage.

As illustrated in FIG. 7, when the display device 100 is in the normally-white mode i.e., when the enable signal has the second level, the first transistor 516 is turned off and the second transistor 517 is turned on. The receiving terminal 511 of the j-th switching sub-circuit and the j-th voltage-dividing signal terminal 44 are conducted, and the second output terminal 513 of the j-th switching sub-circuit and the $2^n$-(j+1) selecting signal terminal 61 are conducted, to output the second analog voltage.

In an implementation of the present disclosure, whether the enable signal has the first level or has the second level may be preset according to a type of the display device. Specifically, when the display device 100 is a normally-black LCD device, the enable signal is set to have the first level. When the display device 100 is a normally-white LCD device, the enable signal is set to have the second level. A voltage value of the first level is greater than a voltage value of the data signal. It should be noted that the level of the enable signal can be determined according to the actual functional requirements.

Figure 8:
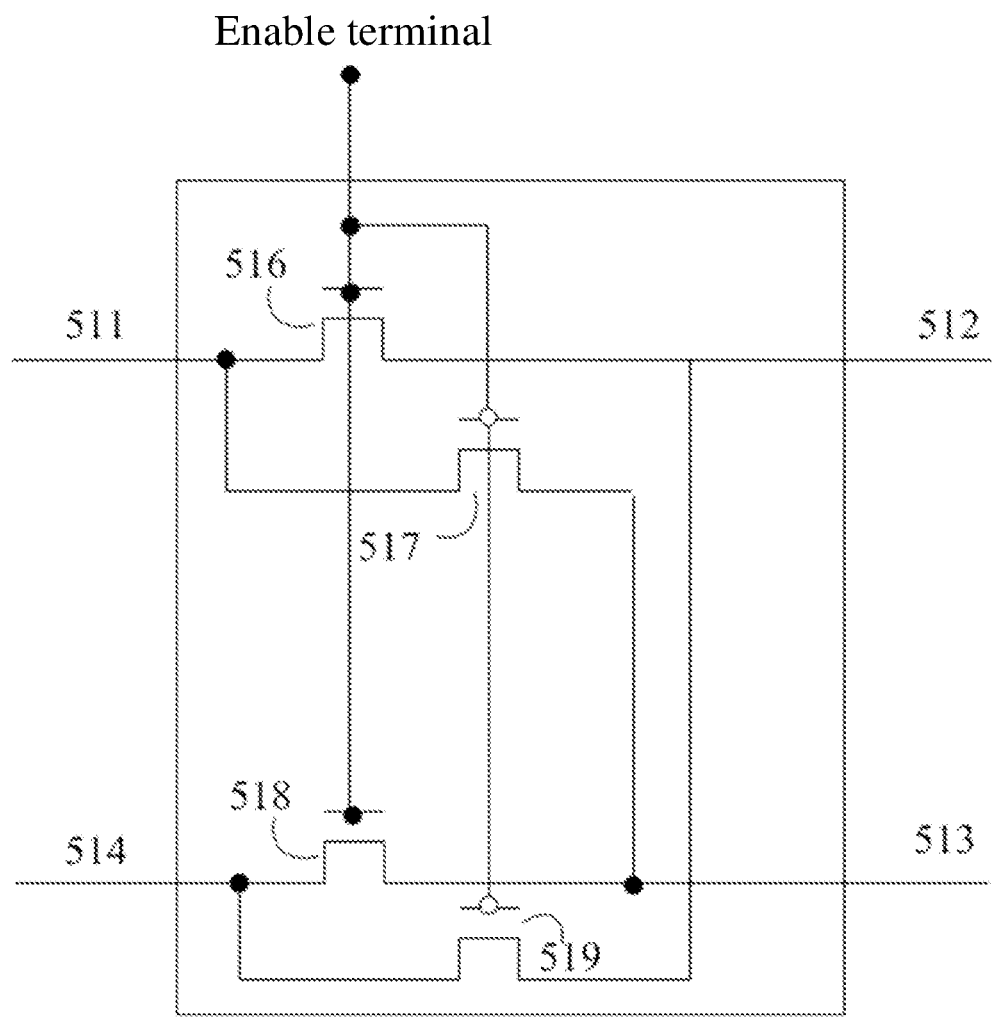
FIG. 8 is a schematic circuit structural diagram of a part of the switching circuit in FIG. 4.

Referring also to FIG. 8, FIG. 8 is a schematic circuit structural diagram of a part of the switching circuit in FIG. 4.

As illustrated in FIG. 8, a connection between the j-th switching sub-circuit 51 and the $2^n$-(j-1)-th switching sub-circuit 51 of the switching circuit 50 is shown. In order to clearly describe the connection between the two switching sub-circuits 51, a receiving terminal of the $2^n$-(j-1)-th switching sub-circuit 51 is denoted as a second receiving terminal 514. The receiving terminal 511 is electrically coupled to the j-th voltage-dividing signal terminal 44, and the second receiving terminal 514 is electrically coupled to the $2^n$-(j-1)-th voltage-dividing signal terminal 44.

The first output terminal 512 of the j-th switching sub-circuit 51 is electrically coupled with the j-th selecting signal terminal 61. The second output terminal 513 of the j-th switching sub-circuit 51 is electrically coupled with the $2^n$-(j-1)-th selecting signal terminal 61.

The first output terminal of the $2^n$-(j-1)-th switching sub-circuit 51 is electrically coupled with the $2^n$-(j-1)-th selecting signal terminal 61, and the second output terminal of the $2^n$-(j-1)-th switching sub-circuit 51 is electrically coupled with the j selecting signal terminal 61.

The $2^n$-(j-1)-th switching sub-circuit 51 also includes a first transistor and a second transistor. In order to clearly describe the circuit connection between the two switching sub-circuits 51, the first transistor of the $2^n$-(j-1)-th switching sub-circuit 51 is denoted as a third transistor 518, and the second transistor of the $2^n$-(j-1)-th switching sub-circuit 51 is denoted as a fourth transistor 519.

Specifically, the third transistor 518 includes a control terminal, a first terminal, and a second terminal. The control terminal and the control terminal of the first transistor 516 are electrically coupled to the enable terminal. The first terminal of the third transistor 518 is electrically coupled to the second receiving terminal 514. The second terminal of the third transistor 518 is electrically coupled to the $2^n$-(j-1)-th selecting signal terminal 61.

The fourth transistor 519 includes a control terminal, a first terminal, and a second terminal. The control terminal and the control terminal of the second transistor 517 are electrically coupled to the enable terminal. The first terminal of the fourth transistor 519 is electrically coupled to the second receiving terminal 514. The second terminal of the fourth transistor 519 is electrically coupled to the j-selecting signal terminal 61.

Figure 9:
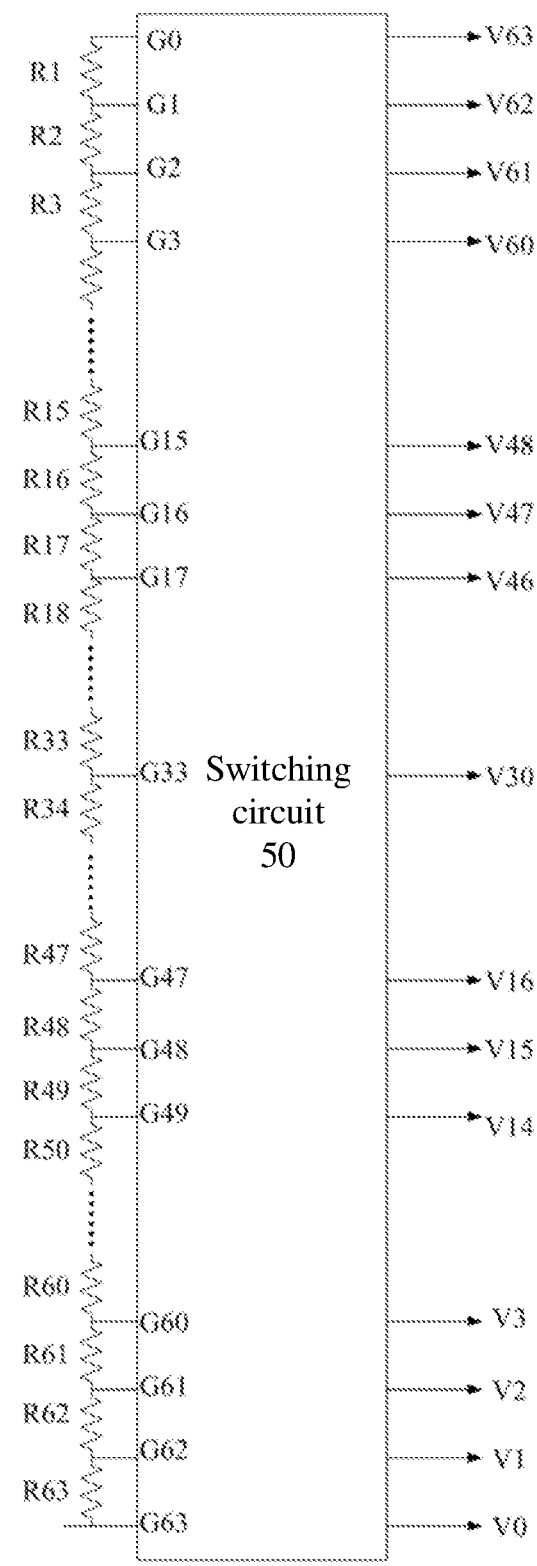
FIG. 9 is a schematic diagram illustrating a correspondence between inputs and outputs of the DAC unit in FIG. 4.

Referring also to FIG. 9, FIG. 10, and FIG. 11. FIG. 9 is a schematic diagram illustrating a correspondence between inputs and outputs of the DAC unit in FIG. 4. FIG. 10 is a diagram illustrating a correspondence between data signals and grayscale values of a display device in a normally-black mode. FIG. 11 is a diagram illustrating a correspondence between data signals and grayscale values of a display device in a normally-white mode. In order to clearly describe the technical solution, n=6 and m=8 are taken as examples in the following, that is, the resistor string 41 includes 63 resistors connected in series and the voltage selecting circuit 60 is an eight-bit binary-tree switch network.

In order to clearly describe the operation principle of the DAC unit 130, data signals used for obtaining different data voltages of analog signals are defined as G0 to G63 from high to low, and correspondingly, grayscale values are defined as V0 to V63 according to the luminance of images of the display device 100 from dark to bright.

As illustrated in FIG. 9, the DAC unit 130 is further provided with the switching circuit 50. The switching circuit 50 is electrically coupled with the resistor string 41. Resistors in the resistor string 41 are sequentially labeled as resistors R1 to R63. Resistors R1 to R63 form 64 serially connected nodes. The 64 serially connected nodes include a first to 64-th serially connected nodes arranged sequentially from low to high voltage. The voltage-dividing signal terminals 44 include a first to 64-th voltage-dividing signal terminals 44 arranged sequentially from low to high voltage. The first to 64-th serially connected nodes are electrically coupled with the first to 64-th voltage signal terminals 44 respectively. As illustrated in FIG. 9, the voltage-dividing signal terminals 44 each correspond to one of the data signals G0 to G63. The data signal is used for controlling the display panel, via the switching circuit 50, to display different grayscale images. The different grayscale images correspond to the grayscale values V63 to V0 as illustrated respectively. It can be appreciated that the correspondence between the data signals G0 to G63 and the grayscale values V63 to V0 is exactly opposite for display devices in different display modes.

For example, for the data signal G1, a switching of the data driving circuit 11 between the display devices in the two modes will be described.

As illustrated in FIG. 10, in the display device in the normally-black mode, the first to m bits of the data signal are 10101010101010, that is, a data signal with the second level is input to the m switches through D0, D1, D2, D3, D4, D5, D6, and D7. A data signal with the first level is input to the m switches through −D0, −D1, −D2, −D3, −D4, −D5, −D6, and −D7. The 2 m switches are turned on or off correspondingly. Since the enable signal has the first level, the receiving terminal 511 and the first output terminal 512 of the j-th switching sub-circuit 51 are conducted. Therefore, the first voltage-dividing signal terminal 44 and the first selecting signal terminal 61 are conducted to output the analog voltage corresponding to the grayscale value V62.

As illustrated in FIG. 11, in the display device in the normally-white mode, the first to m bits of the data signal are still 1010101010101010, that is, a data signal with the second level is input to the m switches through D0, D1, D2, D3, D4, D5, D6, and D7. A data signal with the first level is input to the m switches through −D0, −D1, −D2, −D3, −D4, −D5, −D6, and −D7. The 2 m switches are turned on or off correspondingly. Since the enable signal has the second level, the receiving terminal 511 and the second output terminal 513 of the j-th switching sub-circuit 51 are conducted. Therefore, the first voltage-dividing signal terminal 44 and the 62-nd selecting signal terminal 61 are conducted to output the analog voltage corresponding to the grayscale value V1.

It can be seen that, for LCD devices in different modes, the data driving circuit 11 can control the DAC unit 130 with the same data signal to output two data voltages of analog signals corresponding to different grayscale values. Namely, the data signal G1 can be used for controlling the normally-black LCD device to display in the grayscale value V62, or controlling the normally-white LCD device to display in the grayscale value V1. Furthermore, the data driving circuit 11 can be applied to LCD devices in different modes, that is, the data driving circuit 11 can be applied to both the normally-white LCD device and the normally-black LCD device. Therefore, not only the compatibility of the data driving circuit can be improved and the supply chain mastery measures can be enhanced, but also the application scenarios and the application scopes of the data driving circuit 11 can be expanded.

Based on the same inventive concept, a display module 10 is further provided in the present disclosure. The display module 10 includes a display panel, a scan driving circuit, and the data driving circuit 11 described above. The scan driving circuit and the data driving circuit 11 are electrically coupled with the display panel to jointly drive the display panel to display different images.

Based on the same inventive concept, a display device 100 is further provided in the present disclosure. The display device 100 includes a power supply module 20 and the display module 10. The power supply module 20 is disposed on a back surface of the display module 10, that is, a non-display surface of the display module 10. The power supply module 20 is configured to provide a power supply voltage for the display module 10 to display an image.

It can be appreciated that the display device 100 provided in the implementations of the present disclosure may be any products or components with a display function, such as a notebook computer display screen, an LCD, a liquid crystal television, a mobile phone, and a tablet computer, etc.

In an implementation, the display device 100 also includes other necessary components such as a power supply board, a high voltage board, a key control board, etc., which can be supplemented by those skilled in the art according to the specific type and actual function of the display device 100, and will not be described herein.

It can be appreciated that the display device 100 may also be applied to electronic devices including functions of such as a Personal Digital Assistant (PDA) and/or a music player, e.g., a mobile phone, a tablet computer, a wearable electronic device with a wireless communication function (such as a smart watch), etc. The electronic devices may also be other electronic devices such as a laptop with a touch-sensitive surface (e.g., a touch panel), etc.

In summary, for the data driving circuit 11, the display module 10, and the display device 100 provided in the implementations of the present disclosure, the switching circuit 50 including $2^n$ switching sub-circuits 51 is introduced. Each of the $2^n$ switching sub-circuit includes a receiving terminal, a first output terminal, and a second output terminal. Specifically, the receiving terminal and the first output terminal 512 are selectively coupled to form the first-mode path, or the receiving terminal and the second output 513 are selectively coupled to form the second-mode path. The $2^n$ receiving terminals of the $2^n$ switching sub-circuits 51 are coupled to the $2^n$ voltage-dividing signal terminals 44 respectively. The voltage selecting circuit 60 includes $2^n$ selecting signal terminals 61, and is configured to receive the first to m-th bits of the data signal. Each of the $2^n$ selecting signal terminal is coupled with the first output terminal of one of the $2^n$ switching sub-circuits 51 and the second output terminal of one of the $2^n$ switching sub-circuits 51. The voltage selecting circuit is configured to selectively conduct the voltage-dividing signal terminal 44, the first-mode path, and the selecting signal terminal 61 to output the first analog voltage, or conduct the voltage-dividing signal terminal 44, the second-mode path, and the selecting signal terminal 61 to output the second-mode analog voltage, according to the received data signal. The data driving circuit 11 can be applied to display devices in different modes, that is, the data driving circuit can be applied to both the normally-white LCD device and the normally-black LCD device. The compatibility of the data driving circuit can be improved, and the supply chain mastery measures can be enhanced, and there will be more customers.

It should be appreciated that application of the present disclosure is not limited to the above examples. For those of ordinary skill in the art, improvements or changes can be made according to the above description, and these improvements and changes all fall within the protection scope of the appended claims of the present disclosure.

What is claimed is:

1. A data driving circuit, configured to drive a display device to display different gray sc ale images and comprising:
   a data signal processing (DSP) unit; and
   a digital-to-analog conversion (DAC) unit electrically coupled with the DSP unit, the DAC unit comprising:
     a voltage-dividing circuit comprising $2^n$ voltage-dividing signal terminals arranged sequentially from low to high voltage;
     a switching circuit comprising $2^n$ switching sub-circuits, each of the $2^n$ switching sub-circuits comprising a receiving terminal, a first output terminal, and a second output terminal, receiving terminals of the $2^n$ switching sub-circuits being electrically coupled to the $2^n$ voltage-dividing signal terminals in one-to-one correspondence; and
     a voltage selecting circuit comprising $2^n$ selecting signal terminals, each of the $2^n$ selecting signal terminals being electrically coupled with the first output terminal of one of the $2^n$ switching sub-circuits and the second output terminal of one of the $2^n$ switching sub-circuits, the voltage selecting circuit being configured to receive a data signal from the DSP unit, n being an integer greater than or equal to 2, wherein the voltage-dividing signal terminal, the first output terminal of the switching sub-circuit, and the selecting signal terminal are conducted according to the data signal to output a first analog voltage; or, the voltage-dividing signal terminal, the second output terminal of the switching sub-circuit, and the selecting signal terminal are conducted according to the data signal to output a second analog voltage;
   for a j-th switching sub-circuit, the receiving terminal is electrically coupled to a j-th voltage-dividing signal terminal, the first output terminal is electrically coupled to a j-th selecting signal terminal, the second output terminal is electrically coupled to a $2^n$-j-th selecting signal terminal, and the receiving terminal is selectively coupled with the first output terminal or the second output terminal, wherein j is an integer greater than or equal to 1 and less than $2^n$;
   the j-th switching sub-circuit comprises a first transistor and a second transistor, the first transistor and the second transistor each comprise a control terminal, a first terminal, and a second terminal, the control terminal of the first transistor and the control terminal of the second transistor each are configured to receive an enable signal;
   the first terminal of the first transistor and the first terminal of the second transistor are electrically coupled to the receiving terminal of the j-th switching sub-circuit; and
   the second terminal of the first transistor is electrically coupled to the first output terminal of the j-th switching sub-circuit, and the second terminal of the second transistor is electrically coupled to the second output terminal of the j-th switching sub-circuit.

2. The data driving circuit of claim 1, wherein the first transistor is an N-type metal oxide semiconductor (MOS) transistor and the second transistor is a P-type MOS transistor.

3. The data driving circuit of claim 1, wherein
   when the display device is in a normally-black mode, the enable signal has a first level, and the first output terminal of the j-th switching sub-circuit and the j-th selecting signal terminal are conducted according to the enable signal with the first level to output the first analog voltage; and
   when the display device is in a normally-white mode, the enable signal has a second level, and the second output terminal of the j-th switching sub-circuit and the $2^n$-(j−1)-th selecting signal terminal are conducted according to the enable signal with the second level to output the second analog voltage.

4. The data driving circuit of claim 3, wherein a voltage of the enable signal with the first level is higher than a voltage of the data signal.

5. The data driving circuit of claim 1, wherein the voltage-dividing circuit comprises a first voltage reference terminal, a second voltage reference terminal, and a resistor string of $2^n-1$ resistors connected in series, the resistor string comprises $2^n$ serially connected nodes, the $2^n$ serially connected nodes comprises a first to $2^n$-th serially connected nodes arranged sequentially from low to high voltage, the voltage-dividing signal terminals comprise a first to $2^n$ voltage-dividing signal terminals arranged sequentially from low to high voltage, the first to $2^n$ serially connected nodes are electrically coupled with the first to $2^n$ voltage-dividing signal terminals in one-to-one correspondence, the first serially connected node is electrically coupled to the first voltage reference terminal, and the $2^n$ serially connected node is electrically coupled to the second voltage reference terminal, wherein a voltage of the first voltage reference terminal is lower than a voltage of the second voltage reference terminal.

6. The data driving circuit of claim 1, wherein the voltage selecting circuit is an m-bit binary-tree switch network comprising $2^n-2$ switches, wherein m is a positive integer greater than or equal to n; and
   each path corresponding to each of the voltage-dividing signal terminals comprises m switches, the voltage selecting circuit is configured to receive the data signal and control the m switches to turn on or off correspondingly according to the data signal, to conduct the corresponding voltage-dividing signal terminal, the corresponding switching sub-circuit, and the corresponding selecting signal terminal to output the first analog voltage or the second analog voltage.

7. A display module, comprising:
   a display panel;
   a scan driving circuit; and
   a data driving circuit, comprising:
     a data signal processing (DSP) unit; and a digital-to-analog conversion (DAC) unit electrically coupled with the DSP unit, the DAC unit comprising:
a voltage-dividing circuit comprising $2^n$ voltage-dividing signal terminals arranged sequentially from low to high voltage;
a switching circuit comprising $2^n$ switching sub-circuits, each of the $2^n$ switching sub-circuits comprising a receiving terminal, a first output terminal, and a second output terminal, receiving terminals of the $2^n$ switching sub-circuits being electrically coupled to the $2^n$ voltage-dividing signal terminals in one-to-one correspondence; and
a voltage selecting circuit comprising $2^n$ selecting signal terminals, each of the $2^n$ selecting signal terminals being electrically coupled with the first output terminal of one of the $2^n$ switching sub-circuits and the second output terminal of one of the $2^n$ switching sub-circuits, the voltage selecting circuit being configured to receive a data signal from the DSP unit, n being an integer greater than or equal to 2, wherein
the voltage-dividing signal terminal, the first output terminal of the switching sub-circuit, and the selecting signal terminal are conducted according to the data signal to output a first analog voltage; or, the voltage-dividing signal terminal, the second output terminal of the switching sub-circuit, and the selecting signal terminal are conducted according to the data signal to output a second analog voltage, wherein
the scan driving circuit and the data driving circuit are electrically coupled with the display panel to jointly drive the display panel to display different images;
for a j-th switching sub-circuit, the receiving terminal is electrically coupled to a j-th voltage-dividing signal terminal, the first output terminal is electrically coupled to a j-th selecting signal terminal, the second output terminal is electrically coupled to a $2^n$-(j−1)-th selecting signal terminal, and the receiving terminal is selectively coupled with the first output terminal or the second output terminal, wherein j is an integer greater than or equal to 1 and less than $2^n$;
the j-th switching sub-circuit comprises a first transistor and a second transistor, the first transistor and the second transistor each comprise a control terminal, a first terminal, and a second terminal, the control terminal of the first transistor and the control terminal of the second transistor each are configured to receive an enable signal;
the first terminal of the first transistor and the first terminal of the second transistor are electrically coupled to the receiving terminal of the j-th switching sub-circuit; and
the second terminal of the first transistor is electrically coupled to the first output terminal of the j-th switching sub-circuit, and the second terminal of the second transistor is electrically coupled to the second output terminal of the j-th switching sub-circuit.

8. The display module of claim 7, wherein the first transistor is an N-type metal oxide semiconductor (MOS) transistor and the second transistor is a P-type MOS transistor.

9. The display module of claim 7, wherein
when the display device is in a normally-black mode, the enable signal has a first level, and the first output terminal of the j-th switching sub-circuit and the j-th selecting signal terminal are conducted according to the enable signal with the first level to output the first analog voltage; and
when the display device is in a normally-white mode, the enable signal has a second level, and the second output terminal of the j-th switching sub-circuit and the $2^n$-(j−1)-th selecting signal terminal are conducted according to the enable signal with the second level to output the second analog voltage.

10. The display module of claim 9, wherein a voltage of the enable signal with the first level is higher than a voltage of the data signal.

11. The display module of claim 7, wherein the voltage-dividing circuit comprises a first voltage reference terminal, a second voltage reference terminal, and a resistor string of $2^n$−1 resistors connected in series, the resistor string comprises $2^n$ serially connected nodes, the $2^n$ serially connected nodes comprises a first to $2^n$-th serially connected nodes arranged sequentially from low to high voltage, the voltage-dividing signal terminals comprise a first to $2^n$-th voltage-dividing signal terminals arranged sequentially from low to high voltage, the first to $2^n$-th serially connected nodes are electrically coupled with the first to $2^n$-th voltage-dividing signal terminals in one-to-one correspondence, the first serially connected node is electrically coupled to the first voltage reference terminal, and the $2^n$-th serially connected node is electrically coupled to the second voltage reference terminal, wherein a voltage of the first voltage reference terminal is lower than a voltage of the second voltage reference terminal.

12. The display module of claim 7, wherein the voltage selecting circuit is an m-bit binary-tree switch network comprising $2^n$+1−2 switches, wherein m is a positive integer greater than or equal to n; and
each path corresponding to each of the voltage-dividing signal terminals comprises m switches, the voltage selecting circuit is configured to receive the data signal and control the m switches to turn on or off correspondingly according to the data signal, to conduct the corresponding voltage-dividing signal terminal, the corresponding switching sub-circuit, and the corresponding selecting signal terminal to output the first analog voltage or the second analog voltage.

13. A display device, comprising:
a power supply module; and
a display module, comprising:
a display panel;
a scan driving circuit; and
a data driving circuit, comprising:
a data signal processing (DSP) unit; and
a digital-to-analog conversion (DAC) unit electrically coupled with the DSP unit, the DAC unit comprising:
a voltage-dividing circuit comprising $2^n$ voltage-dividing signal terminals arranged sequentially from low to high voltage;
a switching circuit comprising $2^n$ switching sub-circuits, each of the $2^n$ switching sub-circuits comprising a receiving terminal, a first output terminal, and a second output terminal, receiving terminals of than switching sub-circuits being electrically coupled to the $2^n$ voltage-dividing signal terminals in one-to-one correspondence; and
a voltage selecting circuit comprising $2^n$ selecting signal terminals, each of the $2^n$ selecting signal terminals being electrically coupled with the first output terminal of one of the $2^n$ switching sub-circuits and the second output terminal of one of the $2^n$ switching sub-circuits, the voltage selecting circuit being configured to receive a data signal from the DSP unit, n being an integer greater than or equal to 2, wherein the voltage-dividing signal terminal, the first output terminal of the switching sub-circuit, and the selecting signal terminal are conducted according to the data signal to output a first analog voltage; or, the voltage-dividing signal terminal, the second output terminal of the switching sub-circuit, and the selecting signal terminal are conducted according to the data signal to output a second analog voltage, wherein the scan driving circuit and the data driving circuit are electrically coupled with the display panel to jointly drive the display panel to display different images, wherein the power supply module is disposed on a non-display surface of the display module, and the power supply module is configured to provide a power supply voltage for the display module to display an image;

for a j-th switching sub-circuit, the receiving terminal is electrically coupled to a j-th voltage-dividing signal terminal, the first output terminal is electrically coupled to a j-th selecting signal terminal, the second output terminal is electrically coupled to a $2^n$-(j−1)-th selecting signal terminal, and the receiving terminal is selectively coupled with the first output terminal or the second output terminal, wherein j is an integer greater than or equal to 1 and less than $2^n$;

the j-th switching sub-circuit comprises a first transistor and a second transistor, the first transistor and the second transistor each comprise a control terminal, a first terminal, and a second terminal, the control terminal of the first transistor and the control terminal of the second transistor each are configured to receive an enable signal;

the first terminal of the first transistor and the first terminal of the second transistor are electrically coupled to the receiving terminal of the j-th switching sub-circuit and the second terminal of the first transistor is electrically coupled to the first output terminal of the j-th switching sub-circuit, and the second terminal of the second transistor is electrically coupled to the second output terminal of the j-th switching sub-circuit.

14. The display device of claim 13, wherein the voltage-dividing circuit comprises a first voltage reference terminal, a second voltage reference terminal, and a resistor string of $2^n-1$ resistors connected in series, the resistor string comprises $2^n$ serially connected nodes, the $2^n$ serially connected nodes comprises a first to $2^n$-th serially connected nodes arranged sequentially from low to high voltage, the voltage-dividing signal terminals comprise a first to $2^n$-th voltage-dividing signal terminals arranged sequentially from low to high voltage, the first to $2^n$-th serially connected nodes are electrically coupled with the first to $2^n$-th voltage-dividing signal terminals in one-to-one correspondence, the first serially connected node is electrically coupled to the first voltage reference terminal, and the $2^n$th serially connected node is electrically coupled to the second voltage reference terminal, wherein a voltage of the first voltage reference terminal is lower than a voltage of the second voltage reference terminal.

* * * * *